United States Patent [19]

Weiland

[11] 4,118,830
[45] Oct. 10, 1978

[54] DEVICE FOR SKINNING ANIMALS AND FOWL

[76] Inventor: Richard J. Weiland, 217 Wahl Ave., Evans City, Pa. 16033

[21] Appl. No.: 787,229

[22] Filed: Apr. 13, 1977

[51] Int. Cl.² .............................................. A22B 5/16
[52] U.S. Cl. ........................................... 17/21; 222/5
[58] Field of Search ................... 17/21; 222/5; 141/19

[56] References Cited

U.S. PATENT DOCUMENTS

| 1,764,425 | 6/1930 | Thomas | 17/21 |
| 3,161,322 | 12/1964 | Stone | 222/5 |
| 3,203,592 | 8/1965 | Farandatos | 222/5 |

Primary Examiner—Travis S. McGehee
Attorney, Agent, or Firm—Buell, Blenko & Ziesenheim

[57] ABSTRACT

A small hand-held tubular device, utilizes gas under pressure in a replaceable cartridge carried in the device, to be controllably fed to a hollow needle for skinning purposes. The interior of the tubular body of the device is sealed at the end opposite the needle by a screw cap which, when screwed inwardly presses the tip end of the cartridge against a sharp projection inside the body, thereby piercing the tip of the cartridge. The tip of the cartridge seats on a rubber washer surrounding the piercing point which prevents release of gas under pressure from the pierced cartridge to the needle, until the screw cap relieves the pressure exerted thereby on the cartridge. Capillary feed grooves in a disc having the sharp projection, serve to control the rate of flow of the gas to the needle.

5 Claims, 6 Drawing Figures

U.S. Patent  Oct. 10, 1978  4,118,830
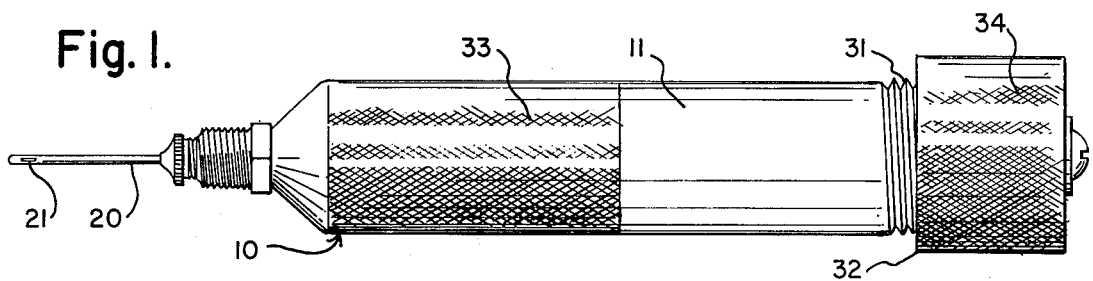
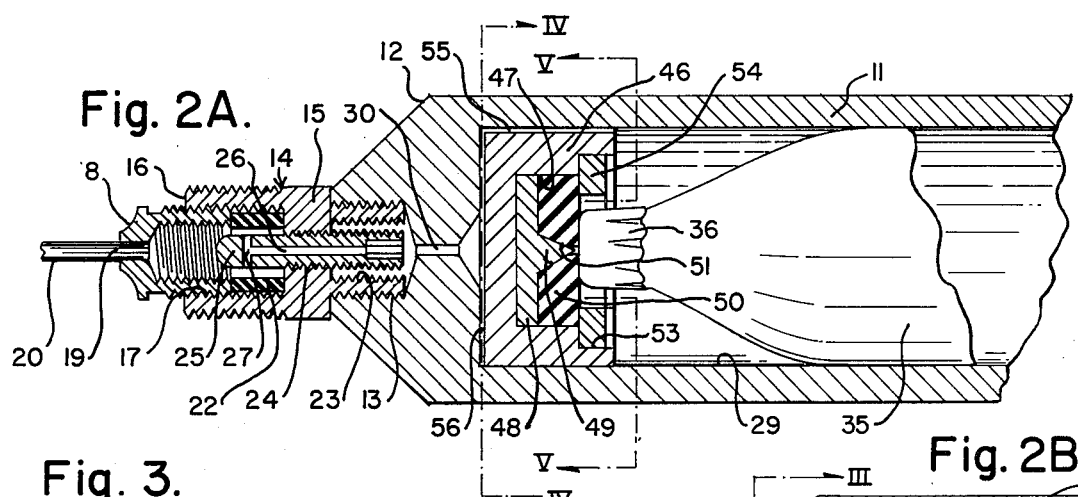
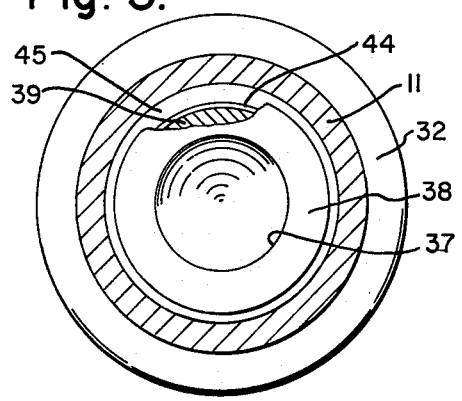
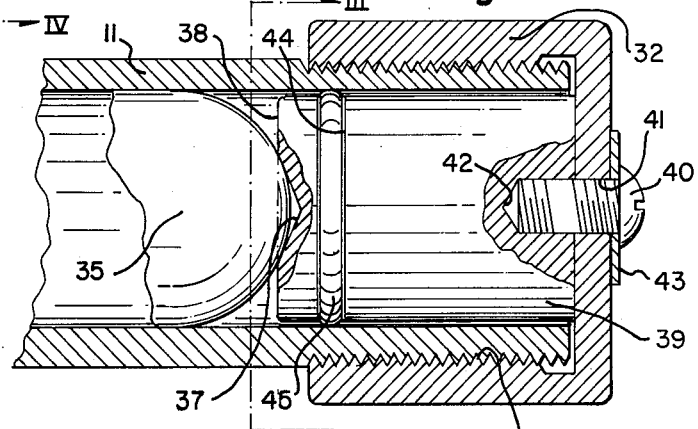
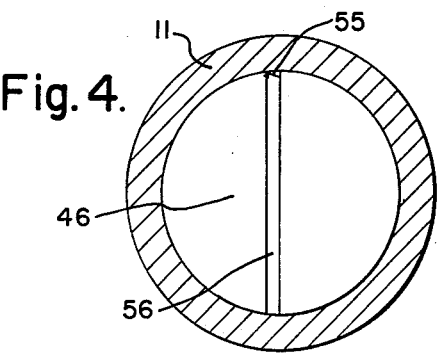
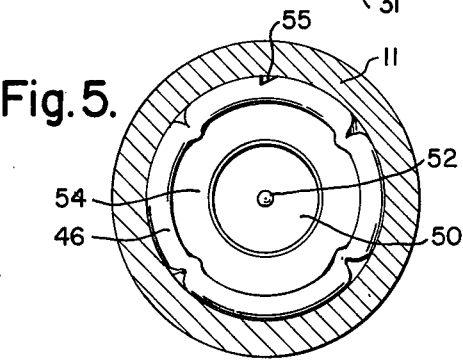

DEVICE FOR SKINNING ANIMALS AND FOWL

This invention relates to devices of the type adapted to communicate a pressurized gas, such as air, between the hide and flesh of an animal or fowl for assisting in skinning the animal or fowl.

I am aware of prior art devices for this general purpose such as those depicted in U.S. Pat. Nos. 537,215; 561,021; 1,263,636; 1,377,872; and 1,764,425.

While the devices shown are adapted to be hand-held, they are all shown as being connectable to a source of compressed air in the form of a large tank or a fixed outlet. In other words, they are all unsuited for use in the field by hunters.

It is an object of my invention to provide a hand-held device for communicating a gas under pressure between the hide and flesh of an animal to assist in removal of the hide, which device is self-contained with regard to the source of gas under pressure. Moreover, it is a further object of my invention to provide a device of the type just described which is readily and easily portable in the field by hunters and which is also susceptible of a continued source of gas under pressure in the form of replaceable cartridges charged under high pressure with air or other suitable gas such as carbon dioxide.

In furtherance of these objects, I provide a hand-held device in the form of a relatively small tubular body in which a replaceable cartridge, containing air or other gas under high pressure, is carried. At one end of the tubular body is a hollow needle communicating with the interior of the tubular body, while at the opposite end is a removable screw cap. Pressurized cartridges are removed and replaced through the open end of the tubular body when the screw cap is removed. The cartridges are preferably bottle-shaped with a cylindrical body closely fitting the interior of the device and with a tapering neck closed by a crimped closure cap. Within the tubular body, at the end adjacent to the hollow needle, is a cylindrical member having a coaxial circular recess open toward the interior of the tubular body. In the recess is fitted a hardened steel disc having a central conical pointed projection surrounded by a rubber washer the face of which is flush with the tip of the conical projection. The screw cap has internally thereof a coaxial cylindrical extension in which is an annular groove carrying a grommet ring which seals within the bore of the tubular body when the cap is screwed thereon. The inner end of the cylindrical extension on the screw cap has a central conical recess in which the rounded outer end of the pressurized cartridge within the tubular body seats. When the screw cap is screwed in sufficiently to exert the necessary pressure, the conical pointed projection pierces the crimped closure cap on the cartridge. As long as the crimped closure cap is pressed to the rubber washer no pressurized gas is released from the pierced closure cap on the end of the cartridge. When the screw cap is unscrewed slightly, the pierced tip on the end of the cartridge acts as a valve past which the pressurized gas escapes into the interior of the tubular body and thence outwardly through the hollow needle.

I furthermore provide means for controlling the rate of flow of the pressurized gas to the needle when the closure cap on the cartridge unseats from the rubber washer, partly in the form of feed grooves on the exterior of the cylindrical member which carries the conical projection and the rubber washer, and partly in the form of a feed control port in the nose end of the device and in a set screw within a coupling by which the hollow needle is attached to the body of the device.

A preferred embodiment of my improved animal skinning device is described in detail hereinafter in connection with the accompanying drawings, wherein:

FIG. 1 is a full scale longitudinal side view of the preferred embodiment of my invention heretofore referred to, FIGS. 2A and 2B are diametrical sectional views, on enlarged scale, of opposite ends respectively of the device shown in FIG. 1, FIG. 3 is a sectional view, taken on the line III—III of FIG. 2B, and FIGS. 4 and 5 are sectional views, taken on the lines IV and V respectively, of FIG. 2A.

Referring to the drawings, the embodiment of my invention shown is an animal skinning device 10 comprising a tubular body 11 of suitable metal, such as brass or stainless steel, the left-hand end of which is sharply tapered at 12 to a nose of reduced diameter. Screwed into a threaded bore 13 centrally of the nose is a coupling 14, having a hex-head nut 15 midway of its ends. Extending outwardly from the nut 15, the coupling has a sleeve portion 16 which has pipe threads on its outer surface. The sleeve portion 16 also has a threaded bore 17, in which is screwed a hollow cap nut 18. The closed end of the cap nut 18 has a hole 19 therein in which a hollow needle 20 is fixed and sealed. The needle 20 has an elongated opening 21 (FIG. 1) therein, adjacent the outer end thereof, through which a gas in the hollow interior of the needle may escape to atmosphere.

A washer 22 of suitable material, such as rubber, is interposed in the threaded bore 17 between the inner end of the cap nut 18 and the bottom of the bore 17 for providing a sealed joint between the hollow needle 20 and the coupling 14.

The threaded end of coupling 14 which is screwed into the threaded bore 13, has a tapped bore 23 open to the inner end of the coupling. Extending through the hex-head nut 15 is a threaded bore 24 in which is screwed a set screw 25. Set screw 25 has a longitudinal passage 26 open at the inner end of the set screw into the bore 13 and at its opposite end intersecting a transverse hole 27 that extends diametrically through the set screw.

As shown in FIG. 2A, the bore 13 in the nose end of the body 11 communicates with the bore 29, constituting the internal diameter of the body 11, through a flow-control port 30, the purpose and function of which will be hereinafter more fully explained.

The right-hand end of the tubular body 11 has external threads 31 and a closed end cap 32 is screwed over the threads 31. To provide for frictionally gripping the tubular body 11, the outer surface of the body is knurled or otherwise finished at 33 as shown in FIG. 1. Also, the outer surface of the end cap 32 is similarly knurled at 34 for the same purpose.

As shown in FIGS. 2A and 2B, a bottle-shaped cartridge 35, conforming closely in outer diameter to the internal diameter or bore 29 of the tubular body 11, is provided. The cartridge 35 is a commercially obtainable pressurized cylinder of metal containing air, carbon dioxide ($CO_2$) or other gas sealed in the cartridge by a crimped end cap 36 of relatively soft metal. The end of the cartridge opposite to the sealed end is rounded and seats in a shallow conical recess 37 in the end face 38 of a cylindrical spool member 39. Spool member 39 is concentrically mounted within the end cap 32, as by attachment to the closed end wall of the end cap. As shown, a round-head screw 40 extends through a central hole 41 in the end wall of the cap and engages in a tapped bore 42 of the spool member registering with the hole 41. A washer 43 is preferably provided for screw 40, as shown.

The spool member 39 is provided, adjacent the end that projects into the bore 29 of the tubular body 11 as the end cap 32 is screwed thereon, with an external annular groove 44 for holding therein a grommet ring 45 which seals with the wall of the bore 29 of the body 11.

As shown in FIGS. 2A, 4 and 5, the device further comprises a cup-shaped cylinder 46 having an outer diameter closely conforming to the bore 29 of the body and which, with additional parts now to be described, is inserted into the bore 29 when the end cap 32 is removed. Cylinder 46 has a circular recess or bore 47 in one face thereof. A disc 48 of hardened and tempered steel fits snugly in the recess 47 and has a central conical projection 49. Also inserted snugly into the recess 47, after the disc 48, is a washer 50 of rubber or other elastomeric material.

Washer 50 has a central conical recess 51 by which the washer seats snugly around the conical projection 49 on disc 48. The conical recess 51 is open at the apex or bottom thereof through a small uniform diameter hole 52 to the opposite face of the washer, so that the sharp point of the conical projection 49 is in the plane of the face of the washer 50.

A circular recess 53, larger in diameter than the recess 47, is provided in the cylinder 46 outwardly relative to the recess 47. A metal retainer ring 54 fits snugly in the recess 53 and overlaps the washer 50. The outer rim of the cylinder 46 is crimped at arcuately spaced points inwardly over the retainer ring 54, as seen in FIG. 5, to hold the ring in place.

The cylinder 46 is provided with an axial groove 55 in the peripheral surface and a diametrical groove 56 in the inner face thereof which intersects the groove 55. It will thus be seen that a gas liberated from the cartridge 35 into the bore 29 of the body as hereinafter described, flows at a controlled rate via grooves 55 and 56 to the port 30, and thence via the passage 26 in the set screw 25 to the interior of the cap screw 18, from whence it escapes through the hollow needle 20.

In operation, with a person holding the body 11 of the device 10 in one hand, after first removing the cap 32, a pressurized cartridge 35 is inserted carefully with the other hand into the bore 29 of the device until the flat end of the crimped closure cap 36 makes contact with the washer 50, as shown in FIG. 2A. Cap 32 is then screwed back on carefully until the person senses contact of the cartridge with the cylindrical extension 39 within the cap. Until the device 10 is ready for use, the cap 32 is not turned further. It will be seen that the grommet ring 45 on the cylindrical extension 39 within the cap 32 seals on the surface of bore 29 in this position of the cap.

When ready for use in skinning an animal, the person first inserts the needle 20 between the hide and flesh of the animal at an appropriate place, and then tightens the screw cap until the end pressure on the cartridge becomes sufficient to cause the sharp projection 49 to pierce the closure cap 36 of the cartridge 35. At this point, no gas escapes as yet from the cartridge by reason of the seal of the washer 50 on the cap 36 of the cartridge. When flow of gas is desired, the operator unscrews the cap 32 slightly and for a short length of time and then tightens the cap again at this time because of reduction of pressure of the closure cap 36 on the rubber washer 50, pressurized gas in the cartridge flows into the bore 29 and thence via flow-control grooves 55 and 56 in the cylinder 46, port 30, passage 26 in set screw 25, and thence out through the hollow needle 20. The re-tightening of the screw cap 32 causes reapplication of pressure by the closure cap of the cartridge on the washer 50, thus cutting off the further flow of gas through the pierced closure cap until later desired. When additional flow of gas is desired, the cap 32 is unscrewed slightly and then re-tightened as before. It will be seen that by reason of the seal of grommet ring 45 on the surface of bore 29, the gas under pressure admitted to the bore can escape therefrom only by way of the flow control grooves 55 and 56, port 30 and passage 26.

It will be further seen that by reason of the restriction offered to the flow of gas by flow control grooves 55 and 56, as well as by port 30 and passage 26 in the set screw 25, the actual quantity of gas released at any one time may be so controlled and limited that a limited number of repeated releases of gas from the cartridge are possible.

Thus my device provides a convenient portable hand-held device which is completely self-contained as to source of gas. It lends itself admirably and advantageously to use by hunters in the field. Although each gas cartridge is susceptible of only a limited number of repeated releases of gas therefrom, it is practical for one person to carry a supply of gas cartridges in the field. Thus, a supply of gas which is adequate for most situations in the field is provided. In addition, while primarily intended for use in skinning animals and fowl, it will be apparent that my improved device is also useful to inflate various inflatable articles, such as footballs, basketballs, rubber mattresses, rubber boats and the like.

I claim:

1. A self-contained animal skinning device for communicating pressurized gas between the hide and flesh of animals and fowl, said device comprising a tubular container, a cartridge in which pressurized gas is sealed, carried within the container, means carried by said container operating to release pressurized gas from said cartridge to the interior of said container, and a hollow needle carried at one end of the said container, and communicating with the interior of said container, said needle having an exit port insertable between the hide and flesh of the animal and fowl for communicating pressurized gas thereto, said tubular container having a relatively small bore at the end thereof communicating with the interior of said tubular container, a sleeve fitting screw-threadedly engaged in said relatively small bore at one end thereof and having the said hollow needle in screw-threaded relation at its opposite end, said sleeve fitting having a diametric partition intermediate of its ends with a threaded hole therein, and a set screw adjustably screwed in said threaded hole, said set screw having a restricted longitudinal passage for restrictedly controlling the rate of flow of pressurized gas from the interior of said tubular container to said needle.

2. A self-contained animal skinning device according to claim 1, wherein said means operative to release pressurized gas from said cartridge comprises a cup-shaped member inserted into said container ahead of said cartridge, said cup-shaped member having a recess therein in which a disc is received, said disc having a sharp projection extending toward said cartridge, a collar of elastomeric material surrounding said sharp projection, on which collar the end of said cartridge seats, and a screw cap for closing the open end of said tubular container through which said cartridge is inserted, said screw cap having an inward extension, engaging said cartridge to apply pressure axially to said cartridge to which pressure said elastomeric collar yields and permits the sharp projection on said disc to puncture said cartridge, said collar sealing on said cartridge to prevent release of pressurized gas through the punctured hole in said cartridge to the interior of said container unless said screw cap is unscrewed to relieve the pressure axially applied to said cartridge.

3. A self-contained animal skinning device according to claim 2, wherein a sealing member on the inward extension of said screw cap engages the interior wall of said tubular container to seal said screw cap against leakage of pressurized gas therepast.

4. A self-contained animal skinning device according to claim 2, wherein said cup-shaped member has cooperating external axial and diametric grooves thereon via which pressurized gas released into the interior of said container escapes at a controlled rate to said hollow needle.

5. An animal skinning device for communicating pressurized gas between the hide and flesh of animals and fowl, said device comprising a tubular body having a bore open at one end, a screw-cap engaging said body for closing said bore at said one end, a cartridge containing a pressurized gas fitted longitudinally in said bore, said cartridge having a closure cap of relatively soft metal at its inner end for sealing said gas in said cartridge, a cup-shaped member inserted into said body bore ahead of said cartridge and having a circular recess therein, a disc of hardened tempered steel having a sharp projection thereon facing toward said cartridge, a washer of elastomeric material surrounding said sharp projection and supporting said cartridge with the closure cap of the cartridge in contact therewith, said screw cap having an internal projection which extends into said bore in sealed relation thereto and into contact with the said cartridge to exert a force on the cartridge sufficient to compress said elastomeric washer which yields so as to cause the said sharp projection on said disc to puncture the said closure cap of said cartridge, but seals the puncture against release of pressurized gas from said cartridge when said screw cap is screwed inwardly of said bore, said screw cap being effective when unscrewed to relieve the axial pressure on said cartridge, thereby to cause said elastomeric washer to shift said cartridge reversely to allow release of pressurized gas from said cartridge into said body bore, and a hollow needle mounted on said tubular body, and being in communication with said body bore for delivery of pressurized gas therefrom to the animal and fowl, said cup-shaped member closely conforming to said body bore and having cooperating axial and diametric grooves on the external surface thereof via which to restrictedly control flow of pressurized gas from said body bore to said needle.

* * * * *